(12) United States Patent
Sala et al.

(10) Patent No.: US 9,864,729 B1
(45) Date of Patent: Jan. 9, 2018

(54) COMPREHENSIVE SENSOR FUSION ALGORITHM

(71) Applicant: Hanking Electronics, Ltd., Canton, OH (US)

(72) Inventors: Leonardo Sala, Cornaredo (IT); Gabriele Cazzaniga, Rosate (IT); Simone Sabatelli, Pisa (IT)

(73) Assignee: Hanking Electronics Ltd., Solon, OH (US)

( * ) Notice: Subject to any disclaimer, the term of this patent is extended or adjusted under 35 U.S.C. 154(b) by 1155 days.

(21) Appl. No.: 13/724,840

(22) Filed: Dec. 21, 2012

(51) Int. Cl.
| | | |
|---|---|---|
| G01P 15/00 | (2006.01) | |
| G01C 17/00 | (2006.01) | |
| G01C 19/00 | (2013.01) | |
| G06F 17/00 | (2006.01) | |
| G06F 17/15 | (2006.01) | |

(52) U.S. Cl.
CPC .............. G06F 17/00 (2013.01); G06F 17/15 (2013.01)

(58) Field of Classification Search
CPC ................................. G06F 17/00; G06F 17/15
USPC .................................................. 702/141, 150
See application file for complete search history.

(56) References Cited

U.S. PATENT DOCUMENTS

| | | | | |
|---|---|---|---|---|
| 8,957,812 B1* | 2/2015 | Hill | ....................... | G01S 5/0027 |
| | | | | 342/445 |
| 2009/0326851 A1* | 12/2009 | Tanenhaus | ............. | G01C 21/16 |
| | | | | 702/96 |
| 2011/0208473 A1* | 8/2011 | Bassompiere | ....... | G01C 21/165 |
| | | | | 702/141 |
| 2011/0279120 A1* | 11/2011 | Sudow | ................. | G01V 1/3835 |
| | | | | 324/334 |
| 2011/0313705 A1* | 12/2011 | Esser | ..................... | A61B 5/112 |
| | | | | 702/104 |
| 2012/0323520 A1* | 12/2012 | Keal | .................. | G01C 19/5776 |
| | | | | 702/141 |
| 2013/0110450 A1* | 5/2013 | Kulik | ..................... | G01C 17/38 |
| | | | | 702/141 |

(Continued)

FOREIGN PATENT DOCUMENTS

| | | | |
|---|---|---|---|
| KR | 20020035386 | * | 5/2002 |
| WO | WO 2010/073044 | * | 7/2010 |

OTHER PUBLICATIONS

Definition of Complimentary Filter, Babylon's Online Dictionary, 2014-2016.*

*Primary Examiner* — Michael Nghiem
(74) *Attorney, Agent, or Firm* — Hartman Global IP Law; Gary M. Hartman; Domenica N.S. Hartman

(57) ABSTRACT

The present invention relates to a signal processor, and more particularly, to systems, devices and methods of using a comprehensive sensor fusion algorithm to integrate sensor data collected by accelerometers, gyroscopes and magnetometers. The signal processor dynamically applies a Complementary Filter to merge a rotation based gyro output and a FQA output that is obtained by combining acceleration rates and magnetic field magnitudes. Therefore, motion information is derived to generate a motion control signal. Such a comprehensive sensor fusion algorithm significantly reduces the complexity of computation, and the power and area overhead is controlled. As a result, the signal processor may be implemented based on local computation capability of a sensor system, and its integration within such a sensor system is made possible without relying on an external microprocessor.

15 Claims, 5 Drawing Sheets

100

(56) References Cited

U.S. PATENT DOCUMENTS

2015/0206682 A1\* 7/2015 Sala ................ G06F 1/3287
307/112

\* cited by examiner

400

500

COMPREHENSIVE SENSOR FUSION ALGORITHM

BACKGROUND

A. Technical Field

The present invention relates to a signal processor, and more particularly, to systems, devices and methods of using a sensor fusion algorithm to integrate sensor data collected by accelerometers, gyroscopes and magnetometers.

B. Background of the Invention

An electronic device has to integrate a variety of sensors in order to accurately monitor movements of the device. These sensors identify different motion parameters at different directions during the course of such movement. In particular, accelerometers, gyroscopes and magnetic compasses are used to detect accelerations, rotation rates and magnetic field magnitudes with respect to certain sensing axes. Such motion information is fused in the electronic device to provide feedback and guidance for subsequent motion control. Nowadays, such motion sensor systems are widely applied in many applications including global positioning systems (GPS), mobile phones, automobiles, satellites and game machines.

Each sensor provides a unique form of motion sensing. Although each sensor has its own strengths, it has some limitations as well. For instance, the accelerometers may sensor both gravity and device acceleration rates which are used to determine the inclination of the device with respect to the ground. However, the heading information is absent, and neither do most accelerometers respond to fast movement as well as to slow movement. The gyroscopes are capable of sensing rotation rates and angles of rotation with respect to a center of mass. Although they have immunity to magnetic interference and linear acceleration noise, the gyroscopes normally do not have an absolute reference, and the rotation rates could be associated with a significant drift over time. The magnetic compasses, also known as magnetometers, may help derive the absolute reference to the magnetic north, and thus, provide the head information that the accelerometers fail to offer. However, the magnetometers are normally sensitive to electromagnetic interference. As a result, these sensors have to be integrated to provide their unique strengths while overcoming their respective inherent limitations.

When signals of a variety of sensors are integrated together, they may result in an enhanced motion sensing experience that is much faster, smoother and more accurate than what each individual sensor can offer separately. Such an experience relies on a condition that the sensor data have to be fused together efficiently. Previously, a Kalman Filter is applied to integrate the sensor data coming from accelerometers, gyroscopes and magnetometers. The Kalman Filter has at least seven states, and if implemented on a 32 bit Advanced RISC Machine (ARM) architecture, would lead to computational complexity of 100 million instructions per second (MIPS) on average. Such computational complexity requires not only a large chip area for implementing the filter, but also large power consumption to sustain its normal operation. Therefore, this filter-based fusion algorithm has been implemented by an external microprocessor.

SUMMARY OF THE INVENTION

Various embodiments of the present invention relate to a signal processor, and more particularly, to systems, devices and methods of using a comprehensive sensor fusion algorithm in a sensor system to integrate various sensor data collected by accelerometers, gyroscopes and magnetometers. Acceleration rates and magnetic field magnitudes are fused based on a Factored Quaternion Algorithm (FQA), and a corresponding FQA output is dynamically merged with a rotation-based gyro output in a complementary filter. Such a sensor fusion algorithm provides accurate motion information, such as direction of movement and angles of rotation, that is further used to generate motion control signal. This sensor fusion algorithm leads to improvement of computational complexity, and therefore, the chip estate and power consumption may be reduced so much that the signal processor incorporating this algorithm may be integrated within the corresponding sensor system.

One aspect of the invention is a signal process that is based on a comprehensive sensor fusion algorithm. A FQA processor is used to combine acceleration rates and magnetic field magnitudes that are provided by at least one accelerometer and at least one magnetometer, respectively. A FQA output is generated. A complementary filter generates a motion control signal by adaptively combining the FQA output with another gyro output which is generated by a gyro-processor from rotation rates.

One aspect of the invention is a signal processing method that is used to fuse sensor data to generate a motion control. Acceleration rates, magnetic field magnitudes and rotation rates are first received with respect to distinct sensing axes. The acceleration rates and the magnetic field magnitudes are combined to generate a FQA output based on a factored quaternion algorithm. The rotation rate is converted to a gyro output which is combined with the FQA to generate the motion control.

One aspect of the invention is a method of integrating sensor data based on dynamic power control. Acceleration rates and magnetic field magnitudes are received with respect to distinct sensing axes, and used to detect a dynamic power control condition. The acceleration rates and the magnetic field magnitudes are combined to generate a FQA output based on a factored quaternion algorithm. The FQA output is processed by a complementary filter to generate a motion control signal.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
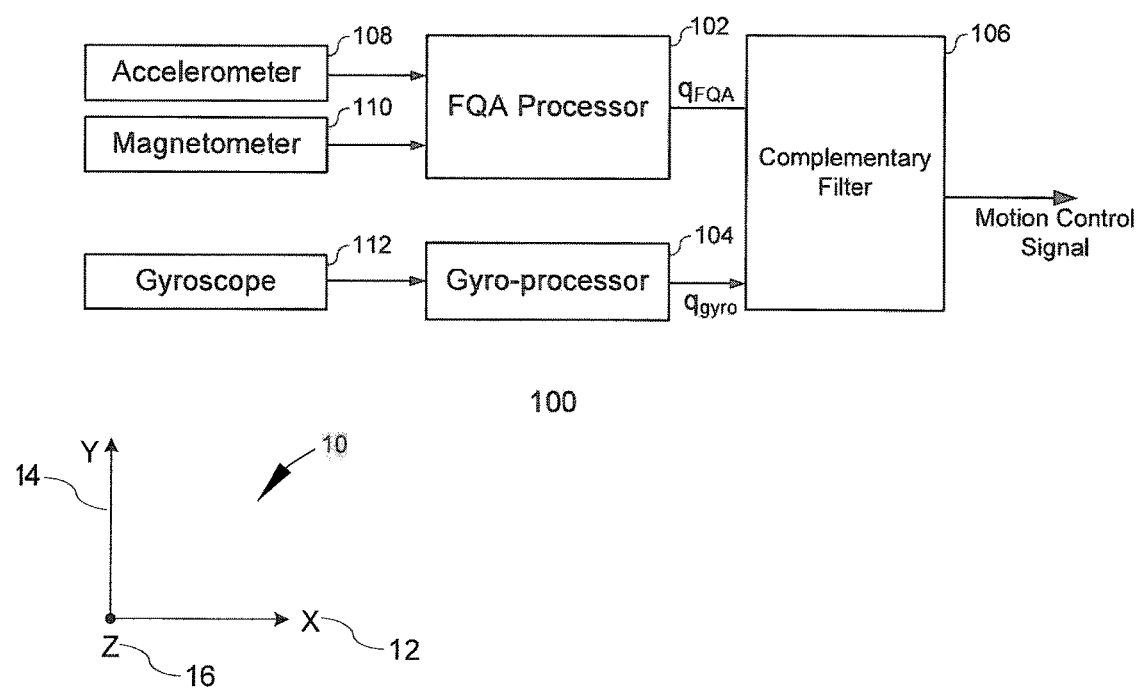
FIG. 1 illustrates an exemplary block diagram of a signal processor that implements a comprehensive sensor fusion algorithm according to various embodiments in the invention.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

The present invention relates to a signal processor that relies on a comprehensive sensor fusion algorithm to locally integrate sensor data that are collected by different sensors within a sensor system. In particular, acceleration rates, rotation rates and magnetic field magnitudes are collected by accelerometers, gyroscopes and magnetometers, and further fused in the signal processor. A rotation based quaternion is dynamically merged in a complementary filter with an integrated sensor data that combines accelerometer and magnetometer sensor data based on a Factored Quaternion Algorithm (FQA). Direction of the movement and orientation of the sensor system are derived to provide feedback and guidance for subsequent motion control.

Such motion information is thus derived in a three-dimensional space accurately. High-frequency and low-frequency accuracy is warranted by the rotation and acceleration rates, respectively. The magnetometers provide information to identify the orientation of the sensor system within a fixed reference frame such as an earth coordinate system related to the gravity direction.

The particular benefit of applying this comprehensive sensor fusion algorithm is that the computational complexity is substantially reduced. The chip estate and power consumption are also reduced to such a level that this sensor fusion algorithm may be implemented by the signal processor integrated locally within the sensor system. As a result of this improvement, the sensor system may spare the need for an external microprocessor, and process sensor data based on local computation capability at a controlled cost of additional power and chip estate.

FIG. 1 illustrates an exemplary block diagram 100 of a signal processor that implements a comprehensive sensor fusion algorithm according to various embodiments in the invention. The signal processor 100 comprises a FQA processor 102, a gyro-processor 104 and a complementary filter 106. The FQA processor 102 dynamically integrates acceleration rates and magnetic field magnitudes based on a factored quaternion algorithm. The acceleration rates and the magnetic field magnitudes are respectively measured by accelerometers 108 and magnetometers 110. The gyro-processor 104 generates another gyro output based on rotation rates provided by gyroscopes 112. The complementary filter 106 further integrates the gyro output and a FQA output generated by the FQA processor 102, and generates a motion control signal.

In various embodiments of the invention, orientation of a corresponding sensor system has to be determined to derive general motion information including direction of the movement and angles of rotations, i.e., pitch, yaw and roll, within a fixed reference frame 10 and orthogonal axes 12, 14, and 16 thereof (FIG. 1). This is particularly true because the motion control signal based on such motion information is often used to provide feedback and guidance for motion control in the fixed reference frame 10. One example is the sensor system used for motion control in the game machines.

The earth coordinate system is an exemplary fixed reference frame 10 that the orientation of the sensor system may be determined with respect to. In one embodiment, one direction 16 (Z) in the earth coordinate system is aligned to the gravity acceleration, and the other two orthogonal directions (X and Y) 12 and 14 may be further aligned with the latitude and longitude lines.

In various embodiments of the invention, the input acceleration rates and the magnetic field magnitudes received by the FQA processor 102 are respectively components of an acceleration vector and a magnetic vector measured with respect to the orthogonal sensing axes 12, 14, and 16. Orientations of these axes 12, 14, and 16 are determined according to how the accelerometers 108 and the magnetometers 110 are arranged, and may change on real-time with movement of the sensor system. Most probably, none of the sensing axes is associated with the direction of the gravity acceleration which is a part of the earth coordinate system.

The factored quaternion algorithm is used to track the orientation of the sensor system within the fixed reference frame. The factored quaternion algorithm is a specific algorithm that allows an orientation quaternion to be calculated from two input vectors, i.e., the acceleration and magnetic vector in this invention. In one embodiment, this factored quaternion algorithm accurately determines the shift of the orthogonal sensing axes from the earth coordinate system based on the acceleration rates and the magnetic field magnitudes. Directions of inertial vectors may be identified, and the inertial data, e.g., acceleration and rotation rates, may be represented with respect to the absolute earth coordinate system as well. Similarly, the pitch, yaw and roll may be determined with respect to the earth coordinate system.

In one embodiment, the FQA output is generated as a quaternion that comprises a scalar part and a vector part, and similarly, the gyro-processor 104 generates the gyro output as another quaternion. Such a signal format facilitates integration between the FQA output and the gyro output within the following complementary filter 106.

The complementary filter 106 relies on both the FQA output based on the acceleration rates and the gyro output to provide comprehensive information of orientation over a wide spectrum. The acceleration and rotation rates reflect a better accuracy level for the inertial information in the low-frequency and high-frequency domains, respectively. The gyro output is adopted to give high-frequency orientation information, while the FQA output is used to provide low-frequency orientation information. Furthermore, the drift of the rotation rates is also continuously compensated within the complementary filter 106.

In some embodiments, the complementary filter 106 integrates a high-pass filter and a low-pass filter that share a pole frequency. Therefore, the FQA output and the gyro output are filtered by the low-pass and high-pass filter, respectively. In particular, the FAQ output and the gyro output may be integrated in the complementary filter 106 as follows:

$$Fc(t)=\alpha F_0(t)+(1-\alpha)F_1(t)$$

wherein $F_0(t)$ and $F_1(t)$ are the quaternion estimated based on the rotation rates and the factored quaternion algorithm, respectively. In various embodiments, the coefficient $\alpha$ may be a constant substantially larger than 0.5, or vary as a function of time.

Figure 2:
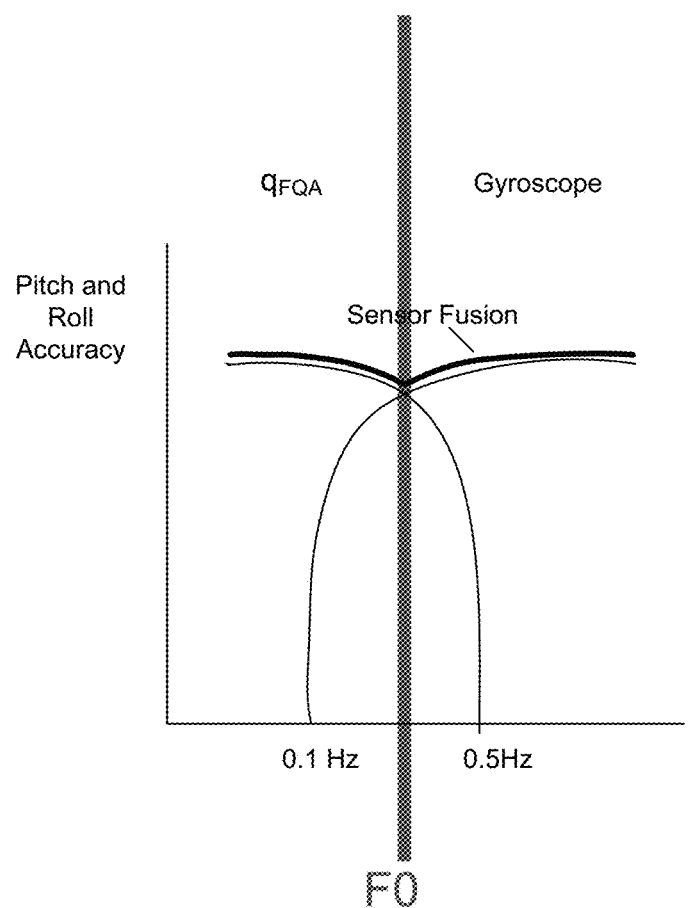
FIG. 2 illustrates an exemplary frequency diagram for the accuracy of pitch and roll according to various embodiments in the invention.

FIG. 2 illustrates an exemplary frequency diagram 200 for the accuracy of pitch and roll according to various embodiments in the invention. In some embodiments, a characteristic frequency $F_0$ is identified, and different scale factors are applied to the complementary filter in two distinct frequency domains that are located on two sides of the characteristic frequency, $F_0$. In the lower frequency domain, a larger scale factor is used for the FQA output than that for the gyro output. However, in the higher frequency, a different set of scale factors are used, and the gyro output is associated with a larger scale factor. Due to frequency-dependent integration of the FQA and gyro outputs, the complementary filter 106 enhances the overall accuracy of these two rotation angles, and enables a substantially uniform accuracy over a wide frequency spectrum.

Figure 3:
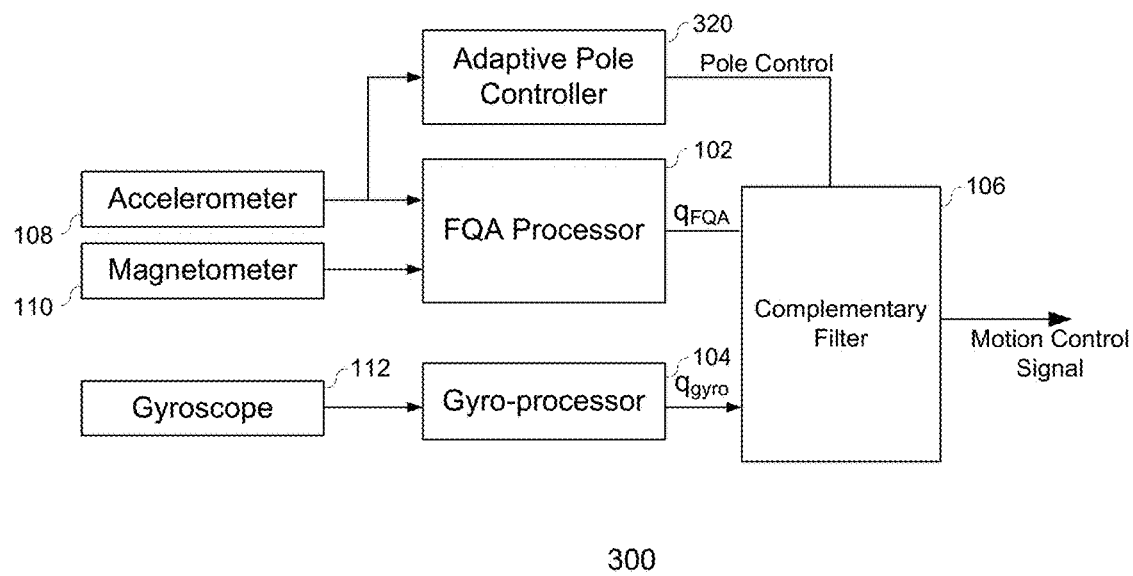
FIG. 3 illustrates another exemplary block diagram of a signal processor that implements a comprehensive sensor fusion algorithm based on adaptive pole control according to various embodiments in the invention.

FIG. 3 illustrates another exemplary block diagram 300 of a signal processor that implements a comprehensive sensor fusion algorithm based on adaptive pole control according to various embodiments in the invention. The signal processor 300 further comprises an adaptive pole controller 320. The adaptive pole controller 320 is coupled to the accelerometers 108, and generates a pole control signal based on the magnitudes of the acceleration rates. The characteristic frequency $F_0$ of the complementary filter 106 is dynamically adjusted according to the pole control signal.

In one embodiment, the acceleration rates detected by the accelerometers 108 increases, and the characteristic frequency $F_0$ is reduced to widen the bandwidth for the gyro output. In another embodiment, the acceleration rates decreases, and the characteristic frequency $F_0$ is enlarged to widen the bandwidth for the FQA output derived from the acceleration rates. A faster recovery of the gyro drift is enabled, when the movement becomes slower.

Figure 4:
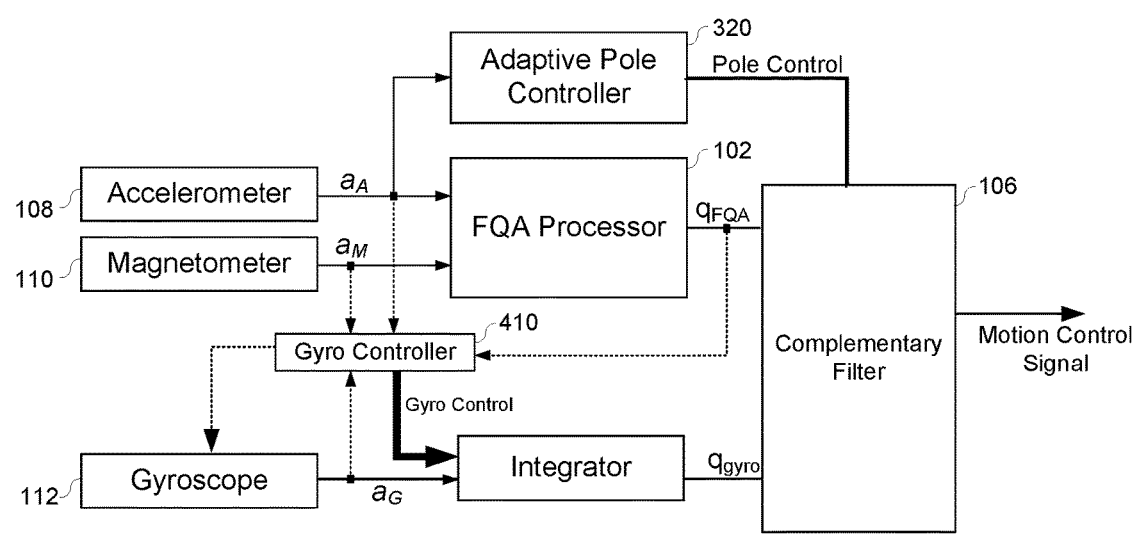
FIG. 4 illustrates another exemplary block diagram of a signal processor that integrates a gyro controller according to various embodiments in the invention.

FIG. 4 illustrates an exemplary block diagram 400 of a signal processor that integrates a gyro controller 410 according to various embodiments in the invention. The gyro controller 410 receives at least one signal from the acceleration rates, the magnetic field magnitudes, the rotation rates and the FQA output, and generates a gyro control to control signal processing within the gyro-processor 104. In one embodiment, the gyro controller 410 estimates a bias according to the FQA output and the rotation rates, and the bias indicates low-frequency drifts of the rotation rates. The corresponding gyro control controls the gyro-processor 104 to compensate the bias. As a result, a gyro output with enhanced accuracy may be provided to the complementary filter 106.

In another embodiment, the gyro controller 410 directly estimates motion in the low frequency domain according to the acceleration rates and the magnetic field magnitudes. The gyro-processor 104 compensates any bias in the gyro output according to the estimation result.

In some embodiments, the gyro control is generated to disable the gyro-processor 104 for dynamic power management. The gyro controller 410 determines whether the movement is sufficiently fast or whether magnetic interference exists. These two situations may be detected by checking whether the acceleration rates and the noises of the magnetic field magnitudes reach their respective threshold values. Upon detection of either one of these two situations, the rotation rates are not needed for accurate orientation determination and adaptive motion control, and therefore, the gyroscope 112 or the gyro-processor 104 may be disabled by the gyro control to conserve power consumption by the sensor system.

Figure 5:
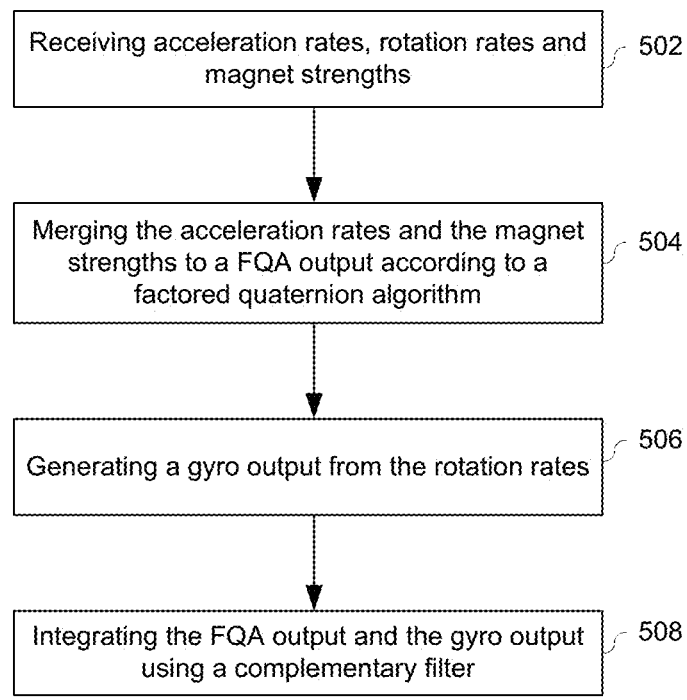
FIG. 5 illustrates an exemplary flow diagram of a method of integrating sensor data according to various embodiments in the invention.

FIG. 5 illustrates an exemplary flow diagram 500 of a method of fusing sensor data according to various embodiments in the invention. At step 502, acceleration rates, rotation rates and magnetic field magnitudes are received with respect to distinct sensing axes. In various embodiments of the invention, three orthogonal sensing axes are determined based on arrangement of the corresponding inertial sensors. In one embodiment, acceleration, rotation and magnetic field magnitudes are associated with three separate sets of orthogonal sensing axes, but in another embodiment, they share the same set of three orthogonal sensing axes.

Magnetic field magnitude. At step 504, the acceleration rates and the magnetic field magnitudes are merged to a FQA output based on a factored quaternion algorithm. The orientations of the sensing axes are determined with respect to a fixed reference frame, and in various embodiments of the invention, this reference frame incorporates three axes that are aligned to the longitude lines, altitude lines and the gravity acceleration. At step 506, a gyro output is generated from the rotation rates. In one embodiment, both the gyro and FQA outputs are quaternions, and each is represented as the sum of a scalar and a vector. At step 508, the FQA output is integrated with the gyro output in a complementary filter. The low-frequency and high-frequency information is incorporated in a controlled manner to give an accurate representation of the orientation and related motion information of the sensor system. Due to such accuracy, the output from the complementary filter may be further used for motion control.

In one embodiment, the scale factors of the complementary filter are adjusted differently in distinct frequency domains, such that different weights may be given to the FQA output and the gyro output according to their respective accuracy characteristics in these domains. In another embodiment, the characteristic frequency $F_0$ is dynamically adjusted according to the acceleration rates sensed by the accelerometers. In particular, the characteristic frequency $F_0$ increases, when the acceleration rates drops.

In various embodiments, this sensor data fusion method has the benefit of accommodating additional filtering options. In particular, a bias of the rotation rates may be estimated and compensated, and magnetic disturbance may be filtered.

In on embodiment, power consumption may be dynamically controlled by skipping sensing and/or processing of the rotation rates. After the acceleration rates and the magnetic field magnitudes are received, they are used to determine whether a dynamic power control condition is satisfied. In various embodiments, the condition is satisfied, when the movement is sufficiently fast or when a certain level of magnetic interference is observed. That is to say, when the acceleration rates or noises in the magnetic field magnitudes exceed a respective threshold value, dynamic power control is enabled, and step 506 of processing the rotation rates is neglected for the purpose of conserving power consumption.

In general, this method of fusing the sensor data allows motion of a sensor system to be determined accurately with improved computational complexity. Orientation of the system may be accurately identified over a wide frequency range, and such accurate information concerning motion of the sensor system may be further used for motion control. In addition, computational complexity is significantly improved by using the factored quaternion algorithm and complementary filtering. In some embodiments, the sensor data may be accurately merged by as few as 10 MIPS, such that complexity is improved by one order from the conventional sensor fusion approach based on a seven-state Kalman Filter. Due to such complexity improvement, less power and chip estate are needed as well. As a result, this accurate sensor data fusion method spares a need for any external microprocessor, and may be implemented locally using a signal processor that is fully integrated within the sensor system.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A signal processor based on a comprehensive sensor fusion algorithm, comprising:
   a Factored Quaternion Algorithm (FQA) processor, coupled to at least one accelerometer and at least one magnetometer, the FQA processor combining one or more acceleration rates and one or more magnetic field magnitudes to generate an FQA output;
   a gyro-processor, coupled to at least one gyroscope, the gyro-processor generating a gyro output based on one or more rotation rates; and
   a complementary filter, coupled to the FQA processor and the gyro-processor, the complementary filter combining the FQA and gyro outputs and generating a motion control signal, the complementary filter having a characteristic frequency and different scale factors that depend on the characteristic frequency and apply different weights based on the different scale factors to the FQA output and the gyro output, wherein the characteristic frequency and the scale factors of the complementary filter being dynamically adjusted based on the magnitude of at least one of the plurality of acceleration rates.

2. The signal processor according to claim 1, wherein the one or more acceleration rates, the one or more rotation rates and the one or more magnetic field magnitudes are associated with a plurality of distinct sensing axes, and orientations of the sensing axes are determined with respect to a fixed reference frame in order to generate the motion control signal.

3. The signal processor according to claim 2, wherein the fixed reference frame is an earth coordinate system based on three orthogonal axes that are aligned to a longitude line, a latitude line and a direction of a gravity gravitational acceleration.

4. The signal processor according to claim 1, wherein the FQA output and the gyro output are associated with a first quaternion and a second quaternion, respectively.

5. The signal processor according to claim 1, wherein lower and higher distinct frequency domains on two sides of the characteristic frequency are identified for the complementary filter, the complementary filter uses a larger scale factor for the FQA output than for the gyro output in the lower frequency domain, and the complementary filter uses a larger scale factor for the gyro output than for the FQA in the higher frequency domain.

6. The signal processor according to claim 5, further comprising:
   an adaptive pole controller, coupled to the at least one accelerometer, the adaptive pole controller generating a pole control signal to control the characteristic frequency of the complementary filter based on the magnitude of at least one of the one or more acceleration rates.

7. The signal processor according to claim 5, wherein the characteristic frequency is adaptively controlled to a lower frequency when a magnitude of at least one of the one or more acceleration rates increases, and, conversely, to a higher frequency when the magnitude of the at least one of the one or more acceleration rates drops.

8. The signal processor according to claim 1, further comprising a gyro controller that generates a gyro control signal to disable the gyro-processor in response to detecting at least one of an acceleration rate and a certain level of magnetic interference reaching a respective threshold value.

9. A method for integrating sensor data, comprising the steps of:
   receiving at least one acceleration rate, at least one magnetic field magnitude and at least one rotation rate;
   using the at least one acceleration rate and magnetic field magnitude to generate a first quaternion based on a Factored Quaternion Algorithm (FQA);
   generating a gyro output that is based on the at least one rotation rate to generate a second quaternion; and
   processing the first and second quaternions and the gyro output by a complementary filter to generate a motion control signal, the complementary filter compensating a drift of the at least one rotation rate, the complementary filter having a characteristic frequency and different scale factors that depend on the characteristic frequency and apply different weights based on the different scale factors to the FQA output and the gyro output, wherein the characteristic frequency and the scale factors of the complementary filter being dynamically adjusted based on the magnitude of at least one of the plurality of acceleration rates.

10. The method according to claim 9, wherein the at least one acceleration rate, the at least one magnetic field magnitude, and the at least one rotation rate are associated with a plurality of distinct sensing axes whose orientations are determined with respect to a fixed reference frame.

11. The method according to claim 10, wherein the fixed reference frame is an earth coordinate system based on three orthogonal axes that are aligned to a longitude line, a latitude line and a direction of a gravitational acceleration.

12. The method according to claim 9, wherein the first quaternion comprises a vector.

13. The method according to claim 9, wherein the complementary filter has lower and higher distinct frequency domains on two sides of the characteristic frequency, the complementary filter uses a larger scale factor for the FQA output than for the gyro output in the lower frequency domain, and the complementary filter uses a larger scale factor for the gyro output than for the FQA in the higher frequency domain.

14. The method according to claim 13, wherein the characteristic frequency is adaptively controlled to a lower frequency when a magnitude of at least one of the at least one acceleration rate increases, and conversely, to a higher frequency when the magnitude of the at least one of the at least one acceleration rate drops.

15. The method according to claim 9, wherein the step of generating a gyro output further comprising:
   estimating motion in a low frequency domain; and
   enabling compensation for a corresponding bias in the gyro output.

* * * * *